(12) United States Patent
Peiffer et al.

(10) Patent No.: US 7,094,465 B2
(45) Date of Patent: *Aug. 22, 2006

(54) MULTILAYER, TRANSPARENT, BIAXIALLY ORIENTED POLYESTER FILM, PROCESS FOR ITS PRODUCTION AND ITS USE

(75) Inventors: Herbert Peiffer, Mainz (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 93 days.

This patent is subject to a terminal disclaimer.

(21) Appl. No.: 10/757,799

(22) Filed: Jan. 15, 2004

(65) Prior Publication Data

US 2004/0146724 A1    Jul. 29, 2004

(30) Foreign Application Priority Data

Jan. 20, 2003    (DE)    ................................. 103 01 786

(51) Int. Cl.
- *B32B 27/08* (2006.01)
- *B32B 27/20* (2006.01)
- *B32B 27/30* (2006.01)
- *B32B 27/36* (2006.01)
- *B32B 37/15* (2006.01)

(52) U.S. Cl. ...................... 428/331; 428/323; 428/480; 428/483; 428/457; 428/458; 428/463; 428/910; 264/173.17; 264/288.4; 264/289.3; 264/290.2

(58) Field of Classification Search ..................... None
See application file for complete search history.

(56) References Cited

U.S. PATENT DOCUMENTS

| | | | |
|---|---|---|---|
| 4,818,581 A * | 4/1989 | Katoh et al. | 428/143 |
| 5,077,118 A * | 12/1991 | Hasegawa et al. | 428/149 |
| 5,240,779 A * | 8/1993 | Ono et al. | 428/458 |
| 5,695,839 A | 12/1997 | Yamada et al. | |
| 5,824,394 A * | 10/1998 | Kinoshita et al. | 428/195.1 |
| 5,955,181 A * | 9/1999 | Peiffer et al. | 428/212 |
| 6,607,808 B1 * | 8/2003 | Peiffer et al. | 428/141 |
| 6,627,295 B1 * | 9/2003 | Peiffer et al. | 428/141 |
| 6,630,224 B1 * | 10/2003 | Peiffer et al. | 428/141 |
| 6,670,030 B1 * | 12/2003 | Uchida et al. | 428/323 |
| 6,797,359 B1 * | 9/2004 | Janssens et al. | 428/141 |
| 6,855,395 B1 * | 2/2005 | Janssens et al. | 428/141 |
| 2002/0068158 A1 * | 6/2002 | Peiffer et al. | 428/220 |
| 2002/0068159 A1 * | 6/2002 | Peiffer et al. | 428/220 |
| 2002/0071945 A1 * | 6/2002 | Peiffer et al. | 428/220 |
| 2002/0160168 A1 * | 10/2002 | Peiffer et al. | 428/215 |
| 2002/0160171 A1 * | 10/2002 | Peiffer et al. | 428/220 |
| 2004/0009342 A1 * | 1/2004 | Janssens et al. | 428/323 |
| 2004/0009355 A1 * | 1/2004 | Janssens et al. | 428/430 |
| 2004/0142147 A1 * | 7/2004 | Peiffer et al. | 428/141 |
| 2004/0142194 A1 * | 7/2004 | Peiffer et al. | 428/500 |
| 2004/0146724 A1 * | 7/2004 | Peiffer et al. | 428/458 |
| 2004/0151987 A1 * | 8/2004 | Kawase et al. | 429/338 |
| 2004/0157069 A1 * | 8/2004 | Klein et al. | 428/481 |

FOREIGN PATENT DOCUMENTS

| | | |
|---|---|---|
| EP | 0 144 948 A2 | 6/1985 |
| EP | 0 144 978 A2 | 6/1985 |
| EP | 0 540 293 A1 | 5/1993 |
| EP | 0 602 964 A1 | 6/1994 |
| EP | 0 903 221 A2 | 3/1999 |
| EP | 0 952 176 A1 | 10/1999 |
| EP | 1 234 848 A1 * | 2/2002 |
| EP | 1 236 568 A1 * | 2/2002 |
| EP | 1 197 328 A1 | 4/2002 |
| EP | 1 234 848 A1 | 8/2002 |
| JP | XP002276539 A | 11/1983 |
| JP | XP002276540 A | 1/2001 |
| JP | 2001-347592 | 12/2001 |
| JP | 2002-275289 * | 9/2002 |
| JP | 2002-307634 * | 10/2002 |
| WO | WO 99/62694 A1 | 12/1999 |
| WO | WO 01/92011 A1 | 12/2001 |
| WO | WO 02/38673 A2 | 5/2002 |

OTHER PUBLICATIONS

Werner, Eberhard et al., "Polyester, Films." Encyclopedia of Polymer Science and Engineering, vol. 12 (1988), pp. 193-216.*
Schmitz, Peter et al., "Films." Ullmann's Encyclopedia of Industrial Chemistry, 5th Ed., vol. A11 (1988), pp. 85-95, 108-110.*

* cited by examiner

*Primary Examiner*—Vivian Chen
(74) *Attorney, Agent, or Firm*—ProPat, L.L.C.

(57) ABSTRACT

The invention relates to a multilayer, transparent, biaxially oriented polyester film having at least one base layer B composed of a thermoplastic polyester, at least one overlayer A coextruded on the base layer B and at least one acrylic coating D which is applied to the film as an aqueous dispersion. The invention further relates to a process for producing the film and to its use.

11 Claims, No Drawings

MULTILAYER, TRANSPARENT, BIAXIALLY ORIENTED POLYESTER FILM, PROCESS FOR ITS PRODUCTION AND ITS USE

FIELD OF THE INVENTION

The invention relates to a multilayer, transparent, biaxially oriented polyester film having at least one base layer B composed of a thermoplastic polyester, at least one overlayer A coextruded on the base layer B and at least one acrylic coating D. The invention further relates to a process for producing the film and to its use.

BACKGROUND OF THE INVENTION

Biaxially oriented polyester films which bear a continuous coating on at least one of their two surfaces are disclosed by the prior art. Likewise disclosed by the prior art are biaxially oriented polyester films which feature very good optical properties.

EP-A 0 144 978 describes an oriented film which is composed of a thermoplastic and bears, on at least one of its two surfaces, a continuous polyester coating which is applied to the film as an aqueous dispersion. The polyester coating consists of a condensation product of various derivatives capable of forming polyesters, such as isophthalic acid, aliphatic dicarboxylic acid, sulfo monomers and aliphatic or cycloaliphatic glycols. The film features in particular good adhesion to metals. Disadvantages of the film are its optical properties, such as transparency or gloss. As a consequence of these disadvantages, this film is no longer used in high-value packaging applications.

EP-A 0 144 948 describes an oriented film which is composed of a thermoplastic and bears, on at least one of its two surfaces, a continuous crosslinked acrylate coating which is applied to the film as an aqueous dispersion. The acrylate coating consists of copolymers having at least 50% by weight of acrylic and/or methacrylic monomers, 1–15% by weight of monomers containing a functional group which is capable, in the copolymerized state, under the action of elevated temperatures, of entering into intermolecular crosslinkages, and also one or more ethylenically monounsaturated, halogen-free monomers in an amount of up to 49% by weight, the percentages in each case being based on the total weight of the copolymer forming the adhesion promoter layer. The film has good printability and is sterilizable. Disadvantages of the film are its optical properties, such as transparency or gloss. As a consequence of this disadvantage, this film is no longer used in high-value packaging applications.

EP-A 0 903 221 relates to an at least three-layer, biaxially oriented polyester film which, coupled with very good processing performance compared to prior art films, has improved optical properties and, after it has been metalized or after it has been coated with oxidic materials, has a good oxygen barrier, and which is composed of at least one base layer B and overlayers A and C applied to this base layer, and these overlayers have a defined number of elevations having a defined height and a defined diameter. The EP-A further relates to a process for producing the film and to its use. The running performance of this film, especially on high-speed packaging machines, is still in need of improvement. Also in need of improvement is the roll formation of films produced in this way. Very good roll formation is required in particular in the metalization or in the processing of the films to give hot-stamping foils.

BRIEF SUMMARY OF THE INVENTION

It is therefore an object of the present invention to provide a transparent, biaxially oriented polyester film having outstanding optical properties and good processibility. In particular, it is an object of the present invention to provide a film which features outstanding roll formation and can be very efficiently processed on high-speed machines, which may be packaging machines, printing machines, metalizers or other vapor deposition units. In addition, the film should have good printability, in particular with nitrocellulose dyes. The film should also be sterilizable. In the production of the film, it should also be guaranteed that film offcut which is obtained as regrind can be fed in an amount of up to 60% by weight, based on the total weight of the film, back to the extrusion and film production, without the physical properties of the film being significantly adversely affected.

This object is achieved by a coextruded, at least two-layer, transparent, biaxially oriented polyester film with at least one base layer B which comprises at least 80% by weight of thermoplastic polyester, and with at least one overlayer A coextruded on the base layer B, and with at least one acrylic coating D, whose characterizing features can be regarded as being that a) fillers present in the base layer B are only those which are introduced into the base layer B by way of reground cut material;

b) the overlayer A comprises an amount of from 500 to 2500 ppm of fillers, based on the weight of the overlayer A, c) the fillers are substantially composed of $SiO_2$ with a median particle diameter $d_{50}$ of from 10 to 60 nm and/or from 1.0 to 5 µm; and that d) at least one of the two surfaces of the film has a continuous crosslinked acrylic coating D which is applied in the form of an aqueous dispersion to the film.

It has been found that, surprisingly, the presence of a crosslinked, acrylic coating D on at least one film surface can distinctly improve both the roll formation and the processability of the film, without the outstanding optical properties of the film being impaired. Also unexpectedly, it has been found that the outstanding optical properties of the film are not reduced when the offcut material occurring in the film production, which generally contains fractions of the acrylic coating, is added to the base layer B of the film as its own regrind.

DETAILED DESCRIPTION OF THE INVENTION

According to the invention, the film has an at least two-layer structure and in that case consists of the base layer B and the overlayer A. One of these two layers bears the continuous crosslinked acrylic coating D which is applied to the film as an aqueous dispersion. Preference is given in this case to applying the acrylic coating D to the base layer B containing only little filler. In a preferred embodiment, the film of the present invention has a three-layer structure and in that case includes a base layer B and two overlayers A and C. Preference is given in this case to applying the acrylic coating D to that overlayer which contains less filler than the other overlayer. In a particularly preferred embodiment, the film of the present invention has a three-layer structure and in that case includes a base layer B and the two overlayers A and C, the two overlayers A and C having the same formulation. This embodiment is referred to as the ABA variant of the three-layer embodiment.

The base layer B of the film preferably contains at least 90% by weight of thermoplastic polyester. Very suitable for this purpose are polyesters of ethylene glycol and terephthalic acid (=polyethylene terephthalate, PET), of ethylene glycol and naphthalene-2,6-dicarboxylic acid (=polyethylene 2,6-naphthalate, PEN), of 1,4-bishydroxymethylcyclohexane and terephthalic acid (=poly(1,4-cyclohexanedimethylene terephthalate), PCDT) and also of ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which consist of at least 90 mol %, preferably at least 95 mol %, of ethylene glycol and terephthalic acid units, or of ethylene glycol and naphthalene-2,6-dicarboxylic acid units. The remaining monomer units stem from other aliphatic, cycloaliphatic or aromatic diols or dicarboxylic acids, as may occur in layer A or layer C.

Suitable other aliphatic diols are, for example, diethylene glycol, triethylene glycol, aliphatic glycols of the general formula HO—$(CH_2)n$—OH where n is an integer from 3 to 6 (in particular propane-1,3-diol, butane-1,4-diol, pentane-1,5-diol and hexane-1,6-diol) or branched aliphatic glycols having up to 6 carbon atoms. Of the cycloaliphatic diols, mention should be made of cyclohexanediols (in particular cyclohexane-1,4-diol). Suitable other aromatic diols correspond, for example, to the formula HO—$C_6H_4$—X—$C_6H_4$—OH where X is —$CH_2$—, —$C(CH_3)_2$—, —$C(CF_3)_2$—, —O—, —S— or —$SO_2$—. In addition, bisphenols of the formula HO—$C_6H_4$—$C_6H_4$—OH are also very suitable.

Other aromatic dicarboxylic acids are preferably benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Of the cycloaliphatic dicarboxylic acids, mention should be made of cyclohexanedicarboxylic acids (in particular cyclohexane-1,4-dicarboxylic acid). Of the aliphatic dicarboxylic acids, the (C3–C19) alkanedioic acids are particularly suitable, and the alkane moiety may be straight-chain or branched.

The polyesters may be prepared, for example, by the transesterification process. This process starts from dicarboxylic esters and diols which are converted with the customary transesterification catalysts such as zinc, calcium, lithium, magnesium and manganese salts. The intermediates are then polycondensed in the presence of generally customary polycondensation catalysts such as antimony trioxide or titanium salts. The preparation may equally well be effected by the direct esterification process in the presence of polycondensation catalysts. This process starts directly from the dicarboxylic acids and the diols.

For the overlayers A and C, the polymers used may in principle be the same as those for the base layer B. The overlayers A and C may additionally contain other materials, in which case the overlayers A and C preferably consist of those polymers which contain ethylene isophthalate units and/or ethylene 2,6-naphthalate units and ethylene terephthalate units. Up to 30 mol % of the polymers may consist of further comonomers. In an advantageous embodiment of the invention, the coated overlayer A or C may contain a mixture of polymers, a copolymer or a homopolymer of ethylene isophthalate units.

Between the base layer B and the overlayer(s) A and C may optionally be disposed another intermediate layer. It may consist of the polymers described for the base layer B. In a particularly preferred embodiment, it consists of the polymer used for the base layer B. The intermediate layer may also contain the customary additives described. The thickness of the intermediate layer is generally greater than 0.3 μm and is preferably in the range from 0.5 to 15 μm, in particular from 1.0 to 10 μm.

The thickness of the overlayer(s) A and C is generally greater than 0.1 μm and is preferably in the range from 0.2 to 5 μm, in particular from 0.2 to 4 μm, and the overlayers A and C may have the same or different thicknesses.

The total thickness of the polyester film according to the invention may vary within wide limits and depends on the intended application. It is from 4 to 50 μm, preferably from 5 to 40 μm, more preferably from 6 to 30 μm, and the base layer B has a proportion of preferably from 40 to 95% of the total thickness of the film.

The base layer B and the other layers may additionally contain customary additives such as stabilizers, antiblocking agents and other fillers. They are appropriately added to the polymer or to the polymer mixture before they are melted. The stabilizers used are, for example, phosphorus compounds such as phosphoric acid or phosphoric esters.

Antiblocking Agents:

Typical antiblocking agents (also referred to in this context as pigments) are inorganic and/or organic particles, for example calcium carbonate, amorphous silica, pyrogenic silica, spherical silicon dioxide particles, talc, magnesium carbonate, barium carbonate, calcium sulfate, barium sulfate, lithium phosphate, calcium phosphate, magnesium phosphate, aluminum oxide, lithium fluoride, calcium, barium, zinc or manganese salts of the dicarboxylic acids used, carbon black, titanium dioxide, kaolin or crosslinked polymer particles, for example polystyrene or acrylate particles.

The additives selected may also be mixtures of two and more different antiblocking agents or mixtures of antiblocking agents of the same composition, but different particle size. The polymers may be added to the polymers of the individual layers of the film in the concentrations which are advantageous in each case, for example as a glycolic dispersion during the polycondensation or via masterbatches in the extrusion. A detailed description of the antiblocking agents can be found, for example, in EP-A-0 602 964.

The overlayer(s) A and C of the film of the present invention preferably contain(s) silica ($SiO_2$) antiblocking agents in colloidal and chainlike form. The antiblocking agents used are:

particles having a median primary particle diameter of from 10 to 60 nm, preferably from 15 to 55 nm and more preferably from 20 to 50 nm and/or particles having a median primary particle diameter $d_{50}$ in the range from 1 to 5.0 μm, preferably in the range from 1.5 to 4.0 μm and more preferably in the range from 2.0 to 3.0 μm.

Particles which satisfy this description are suitable in particular for the production of films which are intended to have very good optical properties such as high gloss and low opacity.

It has also been found to be particularly favorable when the distribution of the particle diameter d of the antiblocking agents used lies within certain limits/ranges. To achieve very low opacity and very high gloss, the overlayer(s) A and C of the film contain(s) a pigment system in which the spread of the diameter d (expressed by the SPAN 98) is less than/equal to 1.9, preferably less than/equal to 1.7.

The pigment concentration in the overlayer A is between 500 and 2500 ppm, preferably between 600 and 2200 ppm and more preferably between 700 and 1900 ppm. In the particularly preferred embodiment of the invention, the film has a three-layer structure and in that case contains the additional overlayer C. The pigment concentration in the overlayer C is then between 50 and 2500 ppm, preferably between 100 and 2300 ppm and most preferably between 150 and 2100 ppm. It is determined in particular by the desired processing performance of the film. Preference is given to selecting the pigment type(s), the pigment concentration(s) and the particle concentration(s), and also the layer thickness ratios, in such a way that the film has good optical properties, and also good preparability and processability.

Coating D:

According to the invention, at least one side of the film is coated with an aqueous dispersion. The coating D on the finished film has a thickness of from 5 to 2000 nm, preferably from 10 to 500 nm, in particular from 20 to 200 nm. The coating D is preferably applied in line, i.e. during the film production process, appropriately before the transverse stretching. Particular preference is given to applying the coating D by means of the reverse gravure-roll coating process in which the coatings D can be applied extremely homogeneously in layer thicknesses up to 100 nm. Preference is likewise given to applying the coating D by the Meyer Rod process by which relatively high coating thicknesses can be achieved. The coating D is preferably applied as a solution, suspension or dispersion, more preferably as an aqueous solution, suspension or dispersion. The coating D mentioned confers on the film surface or on the film the desired functions (low coefficient of friction, good processibility, good roll formation, low static charge) and possible further functions. For example, the printability of the film may be improved or it may be provided with an improved aroma barrier or its adhesion to materials which would otherwise not adhere to the film surface (for example photographic emulsions) may be enabled.

The substances/compositions mentioned are applied to one or both film surfaces as a dilute solution, emulsion or dispersion, preferably as an aqueous solution, emulsion or dispersion, and the solvent or the dispersant is subsequently volatilized. When the coating D is applied in line before the transverse stretching, the heat treatment in the transverse stretching and the subsequent heat-setting generally suffices to volatilize the solvent or the dispersant and dry the coating D.

The solid component present in the aqueous dispersion is acrylic copolymers. The copolymers used with preference consist substantially of at least 50% by weight of one or more polymerized acrylic and/or methacrylic monomers and from 1 to 15% by weight of a copolymerizable comonomer which is capable, in the copolymerized state, under the action of elevated temperature, of forming intermolecular cross-linkages, optionally without the addition of a separate resinous crosslinking agent.

The acrylic component of the copolymers is preferably present in an amount of from 50 to 99% by weight and consists preferably of an ester of acrylic acid or methacrylic acid, in particular an alkyl ester whose alkyl group contains up to ten carbon atoms, for example the methyl, ethyl, n-propyl, isopropyl, n-butyl, isobutyl, tertiary butyl, hexyl, 2-ethylhexyl, heptyl and n-octyl groups. Acrylic copolymers which are derived from a lower alkyl acrylate ($C_1$ to $C_4$), in particular ethyl acrylate, together with a lower alkyl methacrylate, result in particularly good adhesion between the polyester film and reprographic coatings and matt coatings applied thereto. Very particular preference is given to using adhesion promoter copolymers of an alkyl acrylate, e.g. ethyl acrylate or butyl acrylate, together with an alkyl methacrylate, e.g. methyl methacrylate, in particular in the same molar proportions and in a total amount of from 70 to 95% by weight. The acrylate comonomer of such acrylic/methacrylic combinations is preferably present in a proportion of from 15 to 65 mol % and the methacrylate comonomer preferably in a proportion which is generally from 5 to 20 mol % greater than the proportion of the acrylate comonomer. The methacrylate is preferably present in the combination in a proportion of from 35 to 85 mol %.

To increase the solvent resistance, suitable comonomers may optionally be used to form cross-linkages, for example N-methylolacrylamide, N-methylolmethacrylamide and the corresponding ethers; epoxide materials, for example glycidyl acrylate, glycidyl methacrylate and allyl glycidyl ether; monomers containing carboxyl groups, for example crotonic acid, itaconic acid or acrylic acid; anhydrides, for example maleic anhydride; monomers containing hydroxyl groups, for example itaconic anhydride; monomers containing hydroxyl groups, for example allyl alcohol and hydroxyethyl or hydroxypropyl acrylate or methacrylate; amides, for example acrylamide, methacrylamide or maleamide and isocyanates, for example vinyl isocyanate or allyl isocyanate. Of the above-mentioned crosslinking comonomers, preference is given to N-methylolacrylamide and N-methylolmethacrylamide, primarily because copolymer chains which contain one of these monomers are capable of condensing together under the action of elevated temperatures and thus of forming the desired intermolecular cross-linkages. However, the solvent resistance of the preferred acrylate coating which is desired in some cases may also be achieved by the presence of an extraneous crosslinking agent, for example of a melamine- or urea-formaldehyde condensation product. When no solvent resistance is required, crosslinking agent may be dispensed with.

The above-described coating D according to the invention is illustrated in detail in EP-A 0 144 948, to which reference is made explicitly at this point. This prior art also gives information about further specific combinations of such mixed acrylic copolymers which are not reproduced in detail here.

The coating D may be applied to one or both sides of the film. However, it is also possible to provide only one side of the film with the coating according to the invention and to apply another coating to the reverse side. The coating formulation may contain known additives, for example antistats, wetting agents, surfactants, pH regulators, antioxidants, dyes, pigments, antiblocking agents, for example colloidal $SiO_2$, etc. It is normally appropriate to incorporate a surfactant in order to increase the ability of the aqueous coating to wet the substrate film composed of polyester.

In the two-layer basic variant composed of base layer B and pigmented overlayer A, preference is given to coating the base layer B which contains less pigment with the aqueous acrylic dispersion. In this case, the improvements in the properties with regard to processing performance and roll formation are particularly marked. However, the overlayer A may in special cases also have the acrylic coating D.

In the preferred three-layer variant of the film of the present invention having the base layer B and the two overlayers A and C, it is preferable for that layer which has a lower concentration of antiblocking agent to have the acrylic coating D. In this case, the improvements in properties with regard to processing performance and roll formation are particularly marked. However, the other overlayer or both overlayers A and C may in special cases also have the acrylic coating D.

In the particularly preferred three-layer variant of the film of the present invention having the base layer B and the two identical or virtually identical overlayers A and C (ABA variant) the acrylic coating D may be applied to one side or the other as desired, without decisive advantages or disadvantages arising. In special cases, both overlayers A and C may also have the acrylic coating D. In this particularly preferred variant of the film of the present invention, the coefficient of friction (COF) of the film side which bears the acrylic coating D is particularly low. On this (coated) side of the film, the coefficient of friction is then less than 0.5, preferably less than 0.45 and more preferably less than 0.4. The low coefficient of friction makes a substantial contribution to good processing performance of the film and to good roll formation.

A particular advantage is that the production costs of the film according to the invention are only insignificantly above those of a film made of standard polyester raw materials. However the properties of the film according to the invention which are relevant to processing and use are distinctly improved compared to prior art films.

In addition, it is guaranteed when producing the film that the regrind can be reused in a proportion of up to 60% by weight, preferably from 10 to 50% by weight, based in each case on the total weight of the film, without the physical properties of the film being significantly adversely affected.

The present invention also provides a process for producing this film. It comprises:
 the production of a multilayer film composed of a base layer B and overlayer(s) A and, where appropriate, C, by coextrusion;
 the stretching of the film in longitudinal and transverse direction (biaxially);
 the coating of the film with the crosslinking acrylic coating D, preferably between the first stretching step and the second stretching step; and
 the heat-setting of the biaxially stretched film.

To produce the overlayer A and, if appropriate, the overlayer C, the granules of polyethylene terephthalate and the masterbatch of polyethylene terephthalate/antiblocking agent in the desired mixing ratio are appropriately fed directly to the extruder(s). The materials can be melted and extruded at about 300° C.

The polymers for the base layer B are appropriately fed via a further extruder. Any foreign bodies or impurities present can be filtered out of the polymer melt. The melts are then shaped and layered over one another in a multilayer die to give flat melt films. Subsequently, the multilayer film is drawn off and solidified with the aid of a chill roll and optionally further rolls.

The biaxial stretching is generally carried out sequentially. Preference is given to stretching first in longitudinal direction (i.e. in the machine direction) and then in transverse direction (i.e. at right angles to machine direction). This leads to alignment of the molecule chains within the polyester. The stretching in longitudinal direction can be carried out with the aid of two rolls rotating at different rates in accordance with the desired stretching ratio. For transverse stretching, an appropriate tenter frame is generally used.

The temperature at which the stretching is carried out may vary within a relatively wide range and depends upon the desired properties of the film. In general, the stretching is carried out in longitudinal direction at from 80 to 130° C. and transverse stretching at from 90 to 150° C. The longitudinal stretching ratio is in the range from 2.5:1 to 6:1, preferably from 3:1 to 5.5:1. The transverse stretching ratio is in the range from 3.0:1 to 5.0:1, preferably from 3.5:1 to 4.5:1.

In the subsequent heat-setting, the film is held at a temperature of from 150 to 250° C. over a period of from about 0.1 to 10 s. Subsequently, the film is wound up in a customary manner.

Surprisingly, the film coated with the above-described acrylic polymer has very good handling, very good winding properties and very good processing performance. The film of the present invention features outstanding optical properties, outstanding further processing and excellent roll formation. As a consequence of its very good handling and as a consequence of its very good processing properties, the film is thus suitable in particular for processing on high-speed machines.

In addition, the film of the present invention features high gloss and low opacity compared to prior art films. The gloss of the overlayer A (and, if appropriate, of the overlayer C) is greater than 180. In a preferred embodiment, the gloss of this or these side(s) is more than 190 and in a particularly preferred embodiment more than 200. The film having this gloss is particularly suitable for printing or for metalization. The high gloss of the film is transferred to the print or to the applied metal layer and thus confers on the end product the desired commercially effective appearance. The opacity of the film is less than 2.5%, preferably less than 2.2% and more preferably less than 1.9%.

When producing the film, it has been found that, surprisingly, offcut material can be fed as regrind back to the extrusion in an amount of up to 60% by weight, based on the total weight of the film, without the physical properties of the film being significantly adversely affected.

The film according to the invention is outstandingly suitable for the packaging of foods or of other consumable materials of any type.

The table which follows (Table 1) once again summarizes the most important film properties according to the invention.

TABLE 1

|  | Inventive range | Preferred | More preferred | Unit | Measurement method |
|---|---|---|---|---|---|
| Overlayer A |  |  |  |  |  |
| Antiblocking concentration | 500 to 2500 | 600 to 2200 | 700 to 1900 | ppm |  |
| Diameter of the antiblocking particles | 10 to 60 nm and/or 1.0 to 5.0 µm | 10 to 60 nm and/or 1.0 to 5.0 µm | 10 to 60 nm and/or 1.0 to 5.0 µm |  |  |
| SPAN 98 of the particle diameter | <1.9 | <1.8 | <1.7 |  |  |
| Film properties |  |  |  |  |  |
| Gloss | >180 | >190 | >200 |  | DIN 67 530 |
| Opacity | <2.5 | <2.2 | <1.9 | % | ASTM-D 1003-52 |

TABLE 1-continued

| | Inventive range | Preferred | More preferred | Unit | Measurement method |
|---|---|---|---|---|---|
| Coefficient of friction (COF) of the side having an acrylic coating against itself in the particularly preferred ABA variant | <0.5 | <0.45 | <0.4 | | DIN 53 375 |

Test methods

To characterize the raw materials and the films, the following methods were utilized:

SV Value (Standard Viscosity)

The standard viscosity SV (DCA), based on DIN 53726, is measured in dichloroacetic acid.

The intrinsic viscosity (IV) is calculated from the standard viscosity as follows:

IV (DCA)=$6.907 \cdot 10^{-4}$ SV (DCA)+0.063096

Coefficient of Friction

The coefficient of friction was determined to DIN 53 375. The coefficient of sliding friction was measured 14 days after production.

Opacity

The opacity of the film was determined to ASTM-D 1003-52. The determination of opacity according to Hölz was carried out based on ASTM-D 1003-52, except that, to utilize the optimum measuring range, measurement was perfected on four film plies lying one on top of the other and, instead of a 4° pinhole diaphragm, a 1° slot diaphragm was used.

Gloss

The gloss was determined to DIN 67 530. The reflector value was measured as a characteristic optical parameter for the surface of a film. Based on the standards ASTM-D 523-78 and ISO 2813, the angle of incidence was set to 20° or 60°. A light beam hits the flat test surface at the angle of incidence set and is reflected or scattered by it. The light beams incident upon the photoelectronic detector are displayed as a proportional electrical parameter. The measurement is dimensionless and has to be quoted together with the angle of incidence.

Measurement of the Median Particle Diameter $d_{50}$

The determination of the median particle diameter $d_{50}$ was carried out by the standard method by means of laser on a Malvern MasterSizer (other measuring instruments are, for example, Horiba LA 500 or Sympathec Helos, which use the same measurement principle). To this end, the samples were introduced into a cuvette with water and this was then placed in the measuring instrument. The measuring procedure is automatic and includes the mathematical examination of the $d_{50}$ value.

By definition, the $d_{50}$ value is determined from the (relative) cumulative curve of the particle size distribution: the point at which the 50% ordinate value cuts the cumulative curve immediately provides the desired $d_{50}$ value on the abscissa axis.

Measurement of SPAN 98

The determination of SPAN 98 was carried out with the same measuring instrument as described above in the determination of the average diameter $d_{50}$. The SPAN 98 is defined as follows:

$$SPAN98 = \frac{d_{98} - d_{10}}{d_{50}}$$

The basis for determination of $d_{98}$ and $d_{10}$ is again the (relative) cumulative curve of the particle size distribution. The point at which the 98% ordinate value cuts the cumulative curve immediately provides the desired $d_{98}$ value on the abscissa axis, and the point at which the 10% ordinate value cuts the cumulative curve immediately provides the desired $d_{10}$ value on the abscissa axis.

The inventive examples which follow illustrate the invention in more detail.

EXAMPLE 1

The coating D according to the invention contains a 4.5% by weight solution of a latex consisting of a copolymer of 60% by weight of methyl methacrylate, 35% by weight of ethyl acrylate and 5% by weight of N-methylolacrylamide and of a surfactant. The overlayer A of the film of the present invention was coated.

Chips of polyethylene terephthalate were dried at 160° C. to residual moisture of less than 50 ppm and fed to the extruder for the base layer B. Chips of polyethylene terephthalate and of a filler were likewise fed to the extruders for the overlayers A and C. Coextrusion and subsequent stepwise orientation in the longitudinal direction provided a uniaxially oriented film which was corona-treated and coated with the above-described dispersion by means of the reverse gravure process. The dry weight of the coating was approx. 0.035 g/m² (based on the biaxially stretched film). The film which had been longitudinally stretched in this way was stretched in the transverse direction to give a transparent three-layer film having ABC structure and a total thickness of 12 μm. The two overlayers each had a thickness of 1.5 μm.

Base layer B:

100% by weight of polyethylene terephthalate (RT 49 from KoSa) having an SV value of 800 and Overlayers A and C:

92% by weight of polyethylene terephthalate (RT 49 from KoSa) having an SV value of 800 and

| | -continued | | |
|---|---|---|---|
| 8% by weight | of masterbatch of 99% by weight of polyethylene terephthalate and 1.0% by weight of silica particles (SYLOBLOC ® 44 H from Grace) having an average particle size of 2.5 µm. | | |
| | The individual process steps were: | | |
| Extrusion: | Temperatures | A layer: | 300° C. |
| | | B layer: | 300° C. |
| | | C layer: | 300° C. |
| | Die gap width: | | 1 mm |
| | Temperature of the takeoff roll: | | 30° C. |
| Longitudinal stretching: | Temperature: (Heating 80–115° C., stretching at 115° C.) | | 80–115° C. |
| | Longitudinal stretching ratio: | | 4.5 |
| Transverse stretching: | Temperature: | | 80–155° C. |
| | Transverse stretching ratio: | | 4.0 |
| Setting: | Temperature: | | 230° C. |
| Duration: | | | 3 s |

A film was achieved which had very good optical properties, very good processing performance and very good winding quality (cf. Table 3).

EXAMPLE 2

In a similar manner to Example 1, a three-layer ABA film having a total thickness of 12 µm was prepared by coextrusion. Only the composition of the two overlayers A (=C) was changed:

| Overlayers A and C: | |
|---|---|
| 92% by weight | of polyethylene terephthalate (RT 49 from KoSa) having an SV value of 800 and |
| 8% by weight | of masterbatch of 98% by weight of polyethylene terephthalate, 1.0% by weight of silica particles (SYLYSIA ® 300 from Fuji/Japan) having a $d_{50}$ value of 2.0 µm and a SPAN 98 of 1.4 and 1.0% by weight of AEROSIL ® TT600 (Degussa). |

EXAMPLE 3

In a similar manner to Example 1, a three-layer ABC film having a total thickness of 12 µm was produced by coextrusion. Only the composition of the two overlayers A and C was changed. As in the two examples above, the overlayer A of the film was coated in accordance with the present invention.

| Overlayer A: | |
|---|---|
| 98% by weight | of polyethylene terephthalate (RT 49 from KoSa) having an SV value of 800 and |
| 2% by weight | of masterbatch of 98% by weight of polyethylene terephthalate, 1.0% by weight of silica particles (SYLOBLOC ® 44 H from Grace) having an average particle size of 2.5 µm and 1.0% by weight of AEROSIL ® TT600 (Degussa). |
| Overlayer C: | |
| 88% by weight | of polyethylene terephthalate (RT 49 from KoSa) having an SV value of 800 and |
| 12% by weight | of masterbatch of 98% by weight of polyethylene terephthalate and 1.0% by weight of silica particles (SYLOBLOC ® 44 H from Grace) having an average particle size of 2.5 µm and 1.0% by weight of AEROSIL ® TT600 (Degussa). |

EXAMPLE 5

In a similar manner to Example 1, a three-layer ABA film having a total thickness of 12 μm was produced by coextrusion. Only the composition of the two overlayers A (=C) was changed:

| Overlayers A and C composed of: |
|---|
| 90% by weight of polyethylene terephthalate having an SV value of 800 |
| 10% by weight of masterbatch of 99% by weight of polyethylene terephthalate and 1.0% by weight of silica particles (SYLYSIA ® 300 from Fuji/Japan) having a $d_{50}$ value of 2.0 μm and a SPAN 98 of 1.4. |

COMPARATIVE EXAMPLE 1

Example 1 was repeated, except that the film contained no coating D. Although the film exhibits good optical properties, its processing performance was distinctly poorer. Moreover, the winding quality left something to be desired.

a) fillers present in the base layer B are only those which are introduced into the base layer B by way of reground cut material;
b) the overlayer A comprises an amount of from 500 to 2500 ppm of fillers, based on the weight of the overlayer A,
c) the fillers are substantially composed of $SiO_2$ with a median particle diameter $d_{50}$ of from 10 to 60 nm and/or from 1.0 to 5 μm; and wherein
d) at least the overlayer A has a continuous crosslinked acrylic coating D which is applied in the form of an aqueous dispersion to the film
e) said film further exhibiting a coefficient of friction for the coated overlayer A against itself of less than 0.37.

2. The film as claimed in claim 1, which has three layers and is composed of the base layer B and the overlayers A and C on the two sides of the base layer B.

3. The film as claimed in claim 1, which has three layers and is composed of the base layer B and the overlayers A and C, where A=C, on the two sides of the base layer B.

4. The film as claimed in claim 1, wherein to coextruded overlayer A and, optionally, the coextruded overlayer C,

TABLE 2

| Example | Film thickness μm | Film structure | Layer thicknesses ABC μm | Pigments in the layers A | B | C | Average particle diameter A | B μm | C | Pigment concentrations A ppm | B | C |
|---|---|---|---|---|---|---|---|---|---|---|---|---|
| Example 1 | 12 | DABA | 1.5/9.0/1.5 | SYL0BLOC ® 44 H | none | SYL0BLOC ® 44 H | 2.5 | | 2.5 | 800 | 0 | 800 |
| Example 2 | 12 | DABA | 1.5/9.0/1.5 | SYLYSIA ® 300 AEROSIL ® TT 600 | none | SYLYSIA ® 300 AEROSIL ® TT 600 | 2.5 0.04 | | 2.5 0.04 | 800 800 | 0 0 | 800 800 |
| Example 3 | 12 | DABC | 1.5/9.0/1.5 | SYL0BLOC ® 44 H AEROSIL ® TT 600 | none | SYL0BLOC ® 44 H AEROSIL ® TT 600 | 2.5 0.04 | | 2.5 0.04 | 200 200 | 0 0 | 1200 1200 |
| Example 4 | 12 | DABA | 1.5/9.0/1.5 | SYL0BLOC ® 44 H | SYL0BLOC ® 44 H | SYL0BLOC ® 44 H | 2.5 | 2.5 | 2.5 | 800 | 100 | 800 |
| Example 5 | 12 | DABA | 1.5/9.0/1.5 | SYLYSIA ® 300 | none | SYLYSIA ® 300 | 2.0 | | 2.0 | 1000 | 0 | 1000 |
| CE1 | 12 | ABA | 1.5/9.0/1.5 | SYL0BLOC ® 44 H | none | SYL0BLOC ® 44 H | 2.5 | | 2.5 | 800 | 0 | 800 |

TABLE 3

| Examples | Gloss D | Gloss A or C | Opacity | Coefficient of friction D/D | A/A | C/C | Roughness $R_a$ D nm | A nm | C-side nm | Processing performance | Winding Quality |
|---|---|---|---|---|---|---|---|---|---|---|---|
| Example 1 | 210 | 210 | 1.5 | 0.36 | 0.55 | 0.55 | 42 | 43 | 43 | good | good |
| Example 2 | 195 | 195 | 1.7 | 0.34 | 0.5 | 0.5 | 55 | 55 | 55 | very good | very good |
| Example 3 | 220 | 185 | 1.4 | 0.37 | 0.9 | 0.45 | 35 | 35 | 65 | very good | very good |
| Example 4 | 205 | 205 | 1.7 | 0.34 | 0.55 | 0.55 | 45 | 45 | 45 | very good | very good |
| Example 5 | 210 | 210 | 1.5 | 0.32 | 0.5 | 0.5 | 50 | 50 | 50 | very good | very good |
| CE1 | 210 | 210 | 1.5 | | 0.55 | 0.55 | | 43 | 43 | roll shows deficiencies | roll shows longitudinal corrugations |

The invention claimed is:

1. A coextruded, at least two-layer, transparent biaxially oriented polyester film with at least one base layer B which comprises at least 80% by weight of thermoplastic polyester, and with at least one overlayer A comprising polymer coextruded on the base layer B, and with at least one acrylic coating D, wherein comprises fillers in which the spread of the particle diameter d, expressed as SPAN98, is smaller than or equal to 1.9.

5. The film as claimed in claim 1, wherein the acrylic coating D comprises an emulsion copolymer composed of alkyl acrylate and alkyl methacrylate, in which the proportion of the acrylate comonomer present is from 15 to 65 mol% and the proportion of the methacrylate comonomer is from 35 to 85 mol%, based on the total amount of emulsion copolymer, other comonomers also being present in order to develop crosslinking.

6. The film as claimed in claim 5, wherein said other comonomer is —N-methylolacrylamide or N-methylolmethacrylamide.

7. A process for producing a film as claimed in claim 1, encompassing the steps of:
producing a multilayer film composed of a base layer B and overlayer(s) A and, optionally, C, by coextrusion;
biaxial stretching of the film, first longitudinally and then transversely;
coating of the film with the crosslinking acrylic coating D;
heat-setting of the stretched film.

8. The process as claimed in claim 7, wherein an amount of up to 60% by weight, based on the weight of the base layer, of reground cut material is added to the base layer B.

9. The printing or metallizing film formed from film according to claim 1.

10. Packaging film for food or other consumable items comprising film according to claim 1.

11. A polyester film according to claim 1, wherein the polymer used to form said overlayer A consists essentially of polyethylene terephthalate, polyethylene 2,6-naphthalate, poly(1,4-cyclohexanedimethylene terephthalate) or polyethylene 2,6-naphthalate bibenzoate.

* * * * *